(12) United States Patent
Van Gasteren et al.

(10) Patent No.: US 6,243,771 B1
(45) Date of Patent: Jun. 5, 2001

(54) SYSTEM FOR OPERATING A COMMUNICATION CHANNEL IN A MIXED MASTER/SLAVE SUBSCRIBER ENVIRONMENTAL THROUGH A DYNAMICAL CLOSING AND/OR OPENING OPERATION

(75) Inventors: Theodrikus H.I.E. Van Gasteren, Eindhoven; Ferry Huberts, Enschede, both of (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/116,401

(22) Filed: Jul. 16, 1998

(30) Foreign Application Priority Data

Jul. 21, 1997 (EP) .................................................. 97202279

(51) Int. Cl.[7] ......................................................... G06F 13/14
(52) U.S. Cl. .............................. 710/59; 710/264; 709/209
(58) Field of Search ................................. 710/58, 59, 261, 710/264; 709/209; 713/310, 330, 502

(56) References Cited

U.S. PATENT DOCUMENTS

| 4,078,156 | * | 3/1978 | Langan | 179/15 BL |
|---|---|---|---|---|
| 4,860,309 | * | 8/1989 | Costello | 375/17 |
| 5,491,778 | * | 2/1996 | Gordon et al. | 395/133 |
| 5,560,019 | * | 9/1996 | Narad | 395/733 |
| 5,787,482 | * | 7/1998 | Chen et al. | 711/58 |
| 5,838,680 | * | 11/1998 | Noiri et al. | 370/395 |
| 5,838,939 | * | 11/1998 | Sutherland | 712/200 |
| 5,931,902 | * | 8/1999 | Shindoh et al. | 709/213 |

FOREIGN PATENT DOCUMENTS 58-100554 * 6/1983 (JP) .

* cited by examiner

Primary Examiner—Thomas Lee
Assistant Examiner—Thuan Du
(74) Attorney, Agent, or Firm—Steven R. Biren

(57) ABSTRACT

A communication channel is operated in a mixed master/slave subscriber environment by a dynamical closing/opening operation. In particular, a separate handshaking between each subscriber and a central communication module is undertaken. The latter first asserts a first halt command to every master for assuming a first halt state. Upon finding universal prevalence of the first halt state a second halt command is asserted to every slave for assuming a second halt state. Upon detecting universal prevalence of the second halt state a "communications switched off" mode is provided. For resuming, a reverse sequence is executed.

6 Claims, 2 Drawing Sheets

SYSTEM FOR OPERATING A COMMUNICATION CHANNEL IN A MIXED MASTER/SLAVE SUBSCRIBER ENVIRONMENTAL THROUGH A DYNAMICAL CLOSING AND/OR OPENING OPERATION

BACKGROUND OF THE INVENTION

The invention relates to a method for operating a communication channel in a mixed master/slave subscriber environment through dynamical closing and/or opening operations. The channel may be a serial or parallel bus, a hardware network in another configuration, or even a wireless subsystem. A subscriber may be a hardware station, or one of a plurality of coexistent and/or interactive processes, or even a mixture of hardware and software entities. With increasing system complexity, closing and opening of such communication channel between interconnected modules become increasingly difficult. The main reason is that the modules on which the system is based may have such internal complexity, that communication, termination and commence cannot always take place at any arbitrary instant in time.

SUMMARY TO THE INVENTION

In consequence, amongst other things, it is an object of the present invention to provide a straightforward and easy-to-implement solution for the above problem. We thereto describe a method to avoid close down and start up sequence problems of communication channels by using a handshake protocol between all involved modules on one side and a central communication management module on the other side. Now therefore, according to one of its aspects the invention is characterized according to the remaining parts of claim 1.

For organizing a resume situation, rather the reverse sequence of the above is effected, according to the main part of claim 2. Particularly advantageous aspects of the invention relate to power saving, and to the handling of an interrupt routine.

The invention also relates to a system arranged for implementing a method according to the above. Further advantageous aspects of the invention are recited in dependent claims.

BRIEF DESCRIPTION OF THE DRAWING

These and further aspects and advantages of the invention will be discussed more in detail hereinafter with reference to the disclosure of preferred embodiments, and in particular h reference to the appended Figures that show.

DETAILED DESCRIPTION OF PREFERRED EMBODIMENTS

The embodiment that illustrates the behavior of this communication switching protocol consists of hardware modules with a complexity such as encountered in processor architectures, e.g. CPU's, UART's, memory controllers, and DMA-engines. These modules are interconnected through a communication channel, e.g. an on-chip bus system, and may on this channel act as a master, as slave or as a master/slave agent. The communication switching protocol is however not limited to a hardware implementation and may for example also be used in a software module environment, inter alia for organizing inter-process communication.

Problem description: For today's complex building blocks as described above, it is not always possible to close down communication at any arbitrary instant in time. It may for example be necessary that a software process first flushes an internal buffer or internal pipeline before a communication channel may be closed, or that a hardware memory controller module may internally need to update the data to a slow dynamic memory. So as to allow resuming normal operation when the channel will be opened again, all modules (masters and slaves) must be in a well defined internal state when the communication is switched off. Often it is tried to reach such a state by means of a close down software routine. However when multiple masters are involved, this may not always be fully controllable by software and may become a tedious process. For example, a CPU may be executing a close down sequence when an independent master autonomously performs debugging commands or an IO-device suddenly receives external data. Also a start up sequence may be needed in order to get modules to operate fully functionally again, such as switching the refresh process of an embedded dynamic memory back to the system clock, or a controller filling its internal pipeline.

Figure 1:
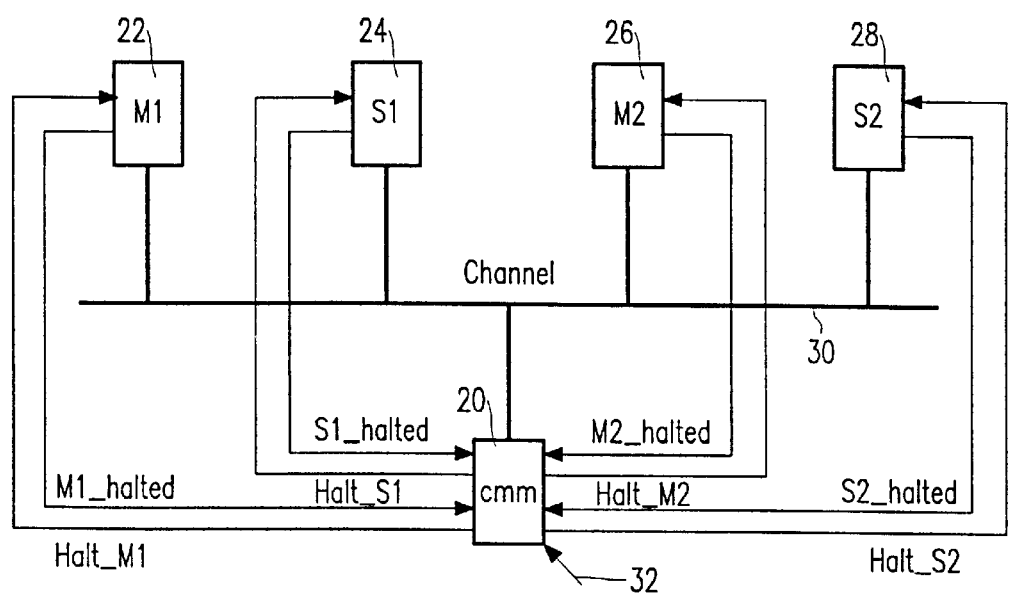
FIG. 1, an overall architecture according to the invention.

As a solution to release the burden of writing software (often complex real time software) for such close down and start up sequences, it is proposed to implement a handshaking mechanism by means of two signals connecting every bus-agent that needs to be in such a defined state to a further bus agent acting as a central communication management module "cmm" 20 in FIG. 1.

Closing the communication channel is effected as follows. Whenever the channel must be closed, e.g. dictated by software running on a CPU, the cmm is instructed by means of a close_communications command 32 that is directed to an internal close down control register, to initiate a close down sequence. Thereupon, first the cmm asserts a respective master_halt signal to every master 22, 26 (Halt_M1 and Halt_M2) to signal that they must end their current communication activities and let their communications part enter a defined state from which a correct start up will be guaranteed. Assertion of these multiple master_halt signals can be done concurrently or sequentially depending on system design aspects. When a master is ready and has its communication part or process in a defined close down state, it asserts its master halted signal (M1_halted and M2_halted) to inform the cmm. From the instant all masters have asserted their master_halted signal, it is guaranteed that there won't be any communication through the channel anymore and the cmm then asserts the halt_slaves signals (Halt_S1 and Halt_S2) to slaves 24, 28, to control them to enter a close down mode. Again this can be done either concurrently or sequentially. When the slaves have their communication part or process in a defined close down state, they assert their respective slave_halted signals (S1_halted and S2_halted). The cmm 20 may now provide a "communications switched off" status if needed, along an interconnection not shown, to a superior item.

Figure 2:
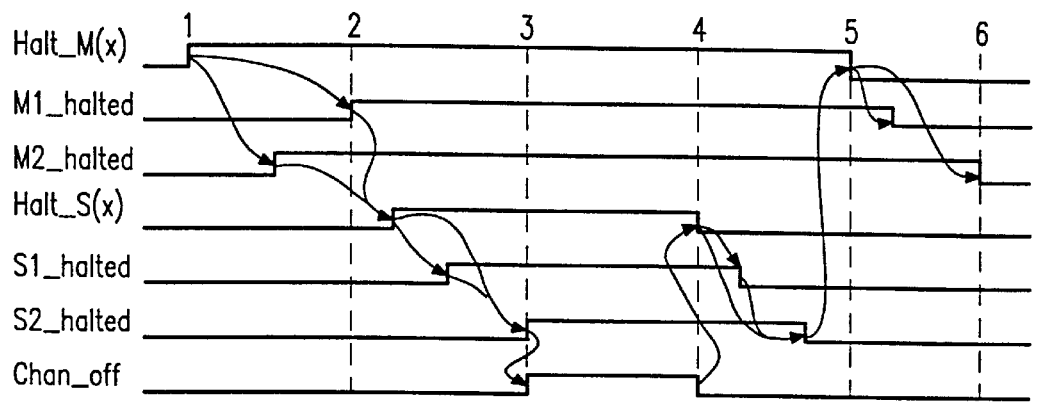
FIG. 2, embodiments of the close-down and start-up sequences.

Opening the communication channel is effected as follows. Depending on system and implementation considerations, some event may cause to open the communication channel. This event results in the cmm the initiating of a start up sequence via the same signals as used to close down communication. In the embodiment, for either signal a unidirectional one-bit line is used. This sequence may be necessary when modules need some time to become fully operational again. The reverse order is used compared to "Closing the communication channel", because when the slaves operate normally it is guaranteed that when a master start acting on the communication channel it will gain normal access to every slave. Therefore after this start up event, the halt_slaves signals are deasserted, and when all the slaves have deasserted their accompanying slave_halted signals, the cmm will deassert the halt_master signals and will wait for all the master_halted signals to become inactive. From that moment on the system is fully operational again. FIG. 2 illustrates this mechanism with the help of timing diagrams. Halt_M(x) and Halt_S(x) are the individual signals Halt_M1, Halt_M2, Halt_S1, etc. as described in FIG. 1. In certain instances, the latter lines could be shared among more than a single master or shared among more than one slave, respectively.

At the response of issuing a close communications command to the cmm, this module asserts the Halt_M(x) signals. At instant 1 the close down sequence of the masters starts. At instant 2 all the masters have signalled to be ready with internal activities and it is guaranteed that no communication will take place anymore. As a result the cmm asserts the Halt_S(x) signals and the close down sequence for the slaves starts. At instant 3 all the slaves are ready with their internal activities and the communication channel is closed, represented by the signal Chan_off. Between instants 3 and 4 the communication channel is closed. When the need for communication through the channel arises at instant 4, e.g. by an external event not shown, the cmm 20 deasserts Halt_S(x). When in return all the slave halted signals are deasserted by the slaves at instant 5, the Halt_M(x) signals may be deasserted by the cmm and the masters enter their start up sequence. They signal a ready state to the cmm by means of their respective master halted signals. All of them are deasserted at instant 6 and the whole system and its communication channel is fully functional again.

Figure 3:
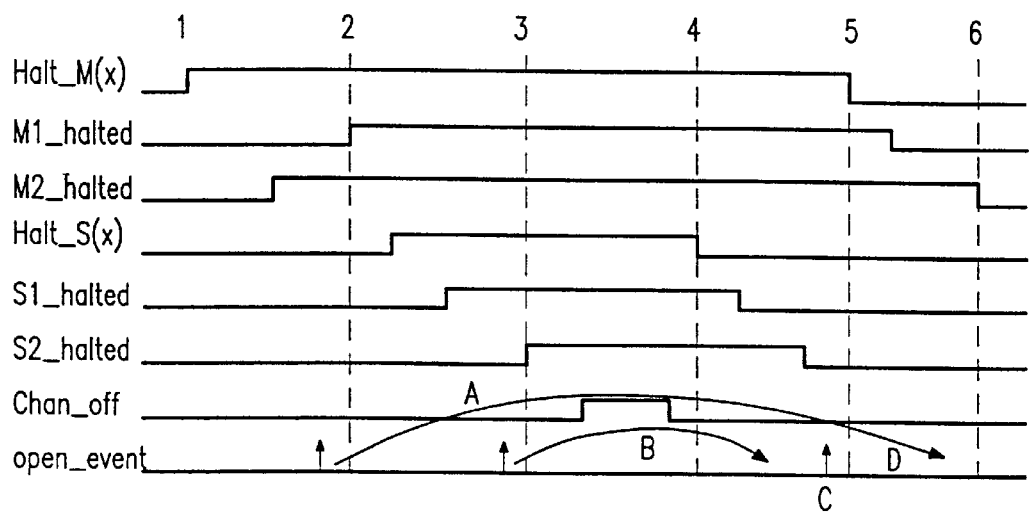
FIG. 3, embodiments for interrupt handling sequences.

An open_event may occur while the closing of the communication channel is in progress, for example by some external or internal interrupt. When such an open_event occurs while the system is involved in a close down sequence, a sort of "touch and go" behavior occurs: masters and slaves that have their communications already switched off, resume communication as if they were involved in a start up sequence at an instant that is in a symmetrical interval with respect to the closed state between instants 3 and 4. This is shown in FIG. 3 where the vertical arrows A and B indicate a jump within the handshake protocol when an open_event occurs. Thus, if the event occurs between instants 1 and 2, the system jumps to the interval between instants 5 and 6. If the event occurs between instants 2 and 3, the system jumps to the interval between instants 4 and 5.

When an open-event occurs when the system is already involved in its start up sequence or the channel is open, the event is ignored. This is illustrated by points C and D, where no arrow is drawn and system continues its actual start up behavior.

The protocol does not dictate whether the system is autonomously re-entering the close-down mode after occurrence and handling of the open_event, or whether it will wait for a further close-down command. This may be defined according to system needs.

Application example. In order to reduce power dissipation in integrated circuits, it is very effective to switch off one or more global clocks, which may include an oscillator and/or a PLL, when no system activity is needed within those clock domains. E.g. in an on-chip bus oriented system, the Chan_off signal serves as a clock switching strobe. It is obvious that a global system clock may only be switched off when all the modules are in a well defined internal state such that switching of the clock will not introduce errors, neither in the communication channel, nor in the module's internal behavior. Therefor the master_halted and slave_halted signals may be combined with the module's internal status. In this application the cmm switches on the clock before initiating the start up sequence to eventually resume normal operation.

Conclusions. When this opening and closing protocol for communication channels is implemented by means of the described handshake mechanism, the close-down and start-up sequence will release the burden of writing possibly complex software for complex modules and complex functional master-slave dependencies within a modular communication channel based environment. When simple communication channel agents are involved, they don't need to be integrated in the handshake protocol so optimizations may be done for more simple system architectures. Also in a situation where there are no functional dependencies between masters, different halt master signals can be combined into a single signal, and analogously for slaves. With the help of this protocol, a safe global clock switching mechanism can be created on a system level.

What is claimed is:

1. A method for operating a communication channel in a mixed master/slave subscriber environment through a dynamical closing or opening operation said method comprising, using a respective handshaking mechanism between every said subscriber and a central communication management means, controlling the latter for asserting a first halt command to every said master subscriber for assuming a first halt state, upon detecting universal prevalence of said first halt state asserting a second halt command to every said slave subscriber for assuming a second halt state, and upon detecting universal prevalence of said second halt state providing a "communications switched off" mode.

2. A method for operating a communication channel in a mixed master/slave subscriber environment through a dynamical closing or opening operation said method, comprising using a respective handshaking mechanism between every said subscriber and central communication management means, controlling the latter for asserting a first resume command to every said slave subscriber for assuming a first resume state, upon detecting universal prevalence of said first resume state asserting a second resume command to every said master subscriber for assuming a second resume state, and upon detecting universal prevalence of said second resume state providing a "communications resumed" mode.

3. A method as claimed in claim 1, for upon said providing of the communications switched off mode through shutting down an actual clock means effecting power savings.

4. A method as claimed in claim 1, arranged for upon detecting an interrupt event during a particular stage of the closing down operation, controlling transition to a stage of the resume operation that is symmetrical in sequence with respect to the closed down stage.

5. A method as claimed in claim 1, wherein any said state is signalled by a subscriber to the communication management means through a single one-bit unidirectional line that is privy to the subscriber in question.

6. A system arranged for implementing a method as claimed in claim 1.

* * * * *